(12) United States Patent
Jäppinen et al.

(10) Patent No.: US 8,664,810 B2
(45) Date of Patent: Mar. 4, 2014

(54) STATOR AND ASSEMBLY METHOD

(75) Inventors: Jari Jäppinen, Helsinki (FI); Jouni Ikäheimo, Kurikka (FI); Jari Pekola, Vantaa (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 13/477,709

(22) Filed: May 22, 2012

(65) Prior Publication Data

US 2013/0134808 A1 May 30, 2013

Related U.S. Application Data

(63) Continuation of application No. PCT/FI2010/050949, filed on Nov. 23, 2010.

(30) Foreign Application Priority Data

Nov. 23, 2009 (EP) .................................... 09176739

(51) Int. Cl.
*H02K 9/00* (2006.01)

(52) U.S. Cl.
USPC .............................................. 310/59; 310/52

(58) Field of Classification Search
USPC .................. 310/52–59; 29/596–598
See application file for complete search history.

(56) References Cited

U.S. PATENT DOCUMENTS

| | | | | |
|---|---|---|---|---|
| 3,414,749 | A * | 12/1968 | Abegg ............................ | 310/52 |
| 6,800,971 | B1 * | 10/2004 | Mangold et al. ................ | 310/52 |
| 8,350,424 | B2 * | 1/2013 | Af Ursin ......................... | 310/64 |
| 8,405,262 | B1 * | 3/2013 | Beatty et al. .................... | 310/58 |
| 2004/0012272 | A1 | 1/2004 | Houle et al. | |
| 2005/0067904 | A1 | 3/2005 | Houle et al. | |
| 2009/0026858 | A1 | 1/2009 | Knauff | |
| 2009/0160269 | A1 | 6/2009 | Bischof et al. | |
| 2010/0102649 | A1 * | 4/2010 | Cherney et al. ................. | 310/54 |
| 2011/0227431 | A1 * | 9/2011 | Af Ursin ......................... | 310/54 |

FOREIGN PATENT DOCUMENTS

DE 10 2006 005 316 A1 8/2007
EP 0 793 332 A1 9/1997

OTHER PUBLICATIONS

The extended European Search Report dated Dec. 21, 2010, issued in corresponding European Patent Application No. 09176739.2. (5 pages).
International Search Report (PCT/ISA/210) issued on Jan. 24, 2011, by the Finnish Patent Office as the International Searching Authority for International Application No. PCT/FI2010/050949.
Written Opinion (PCT/ISA/237) issued on Jan. 24, 2011, by the Finnish Patent Office as the International Searching Authority for International Application No. PCT/FI2010/050949.

* cited by examiner

*Primary Examiner* — Thanh Lam
(74) *Attorney, Agent, or Firm* — Buchanan Ingersoll & Rooney PC

(57) ABSTRACT

An exemplary stator disk of an electric motor stator includes a set of recesses. Each recess being configured to receive a cooling pipe. The stator disk includes one or more positioning elements for aligning the stator disk with another stator disk. The one or more positioning elements being positioned to the stator disk such that when the stator disk is set to a rotated position with respect to the other stator disk in order to align the recesses of the disks for receiving of cooling pipes, the positioning elements of the two disks become only partly aligned with each other.

11 Claims, 2 Drawing Sheets ated application PCT/FI2010/050949 filed on Nov. 23, 2010 and designating the U.S., which claims priority to European application EP09176739.2 filed in Europe on Nov. 23, 2009. The contents of which are hereby incorporated by reference in their entireties.

STATOR AND ASSEMBLY METHOD

RELATED APPLICATION

This application is a continuation under 35 U.S.C. §120 of International Application PCT/FI2010/050949 filed on Nov. 23, 2010 and designating the U.S., which claims priority to European application EP09176739.2 filed in Europe on Nov. 23, 2009. The contents of which are hereby incorporated by reference in their entireties.

FIELD

The present disclosure relates to electric motors such as an electric motor having an assembly for cooling the stator.

BACKGROUND

In known electric motors, a rotatable rotor is arranged within/around a stationary stator. The mechanical losses associated to the rotation, such as friction force in bearings, the copper losses affected by the electric current running through the resistance of the windings and the iron losses generated by the magnetic flux cause heat generation during operation. In order to avoid overheating, and to improve the efficiency of the motor, cooling of the motor needs to be provided.

For the cooling of the motor, liquid and/or gas cooling can be arranged. U.S. 2009/0160269 A1 discloses a manner in which cooling pipes can be arranged to the stator.

A known challenge in arranging the cooling involves determining how to attach properly the cooling pipes, proper attachment being needed to avoid noise and breakage of the pipes when the motor is in operation.

It is known to use glue in fastening of the cooling pipes to the groove of the stator. However, glue destroys or at least weakens the metallic contact between the cooling pipe and the stator, which deteriorates the cooling effect.

Other known processes cast the cooling channels directly to the body of the motor. Such a solution is generally, however, not cost effective.

SUMMARY

An exemplary stator disk of an electric motor stator is disclosed, comprising: a set of recesses, each recess being configured to a receive a cooling pipe; and one or more positioning elements for aligning the stator disk with another stator disk, the one or more positioning elements being positioned to the stator disk such that when the stator disk is set to a rotated position with respect to the other stator disk in order to align the recesses of the disks for receiving cooling pipes, the positioning elements of the two disks become only partly aligned with each other.

An exemplary stator of an electric motor is disclosed, comprising: a plurality of stator disks stacked together to form the stator, wherein each stator disk comprises: a set of recesses, each recess being configured to a receive a cooling pipe; and one or more positioning elements for aligning the stator disks together, wherein the one or more positioning elements are positioned to the stator disks such that when two stator disks are set to a rotated position with respect each other in order to align the recesses of the disks for receiving a cooling pipe, the positioning elements of the two disks become only partly aligned with each other.

An exemplary method of mounting a stator of an electric motor is disclosed, comprising: providing a plurality of stator disks, each disk having recesses for receiving cooling pipes, and one or more alignment elements for alignment of the disk to other stator disks; rotating at least some of the stator disks to a rotated position with respect to other stator disks, such that the recesses of the mutually rotated disks are aligned, and the positioning elements are misaligned with each other; placing the cooling pipes in the recesses; and aligning the positioning elements with each other such that the recesses of the mutually rotated disks cause opposite pressing forces to the cooling pipes.

BRIEF DESCRIPTION OF THE DRAWINGS

In the following the disclosure will be described in greater detail by means of exemplary embodiments with reference to the attached drawings, in which.

DETAILED DESCRIPTION

Exemplary embodiments of the present disclosure provide a method and an apparatus for implementing the method so as to alleviate the above disadvantages.

Exemplary embodiments of the present disclosure allow the cooling pipes to be tightly mounted to the stator of the electric motor, thereby reducing noise generation and the risk of breakage during operation of the motor.

Figure 1:
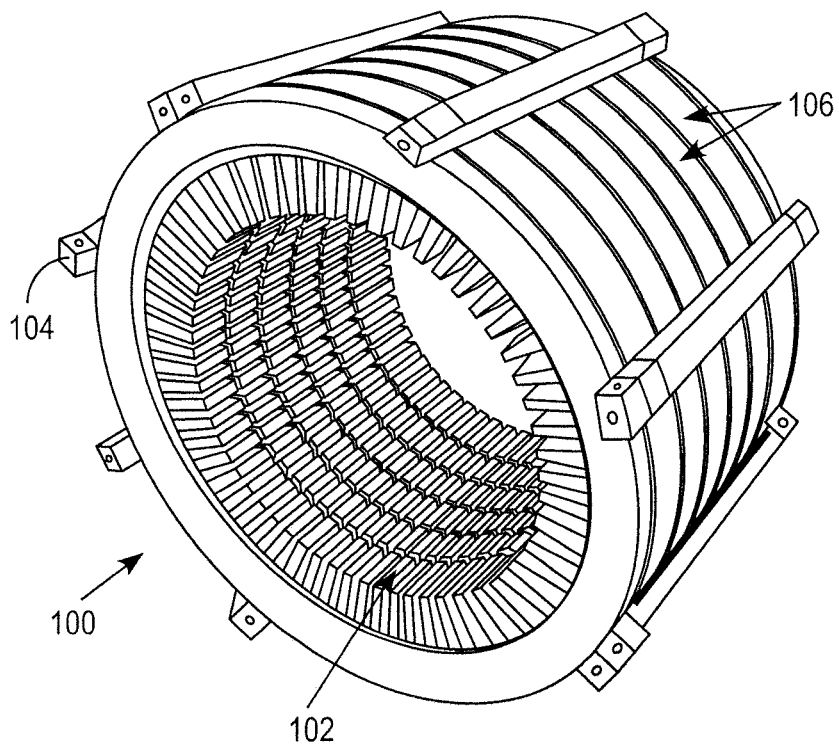
FIG. 1 shows a stator in accordance with an exemplary embodiment of the present disclosure.

FIG. 1 shows a stator in accordance with an exemplary embodiment of the present disclosure. The stator 100 includes slots 102 around which conducting wire is wound to form coils. When electricity is supplied to the coils in a rotating manner, a rotating magnetic field is achieved causing the rotor, equipped with squirrel cage windings and/or permanent magnets to rotate.

The stator is stacked from stator segments 106 having stator disks. Bands 104 may be provided to attach the segments to each other by welding, for instance. No cooling is associated with the stator of FIG. 1.

Figure 2:
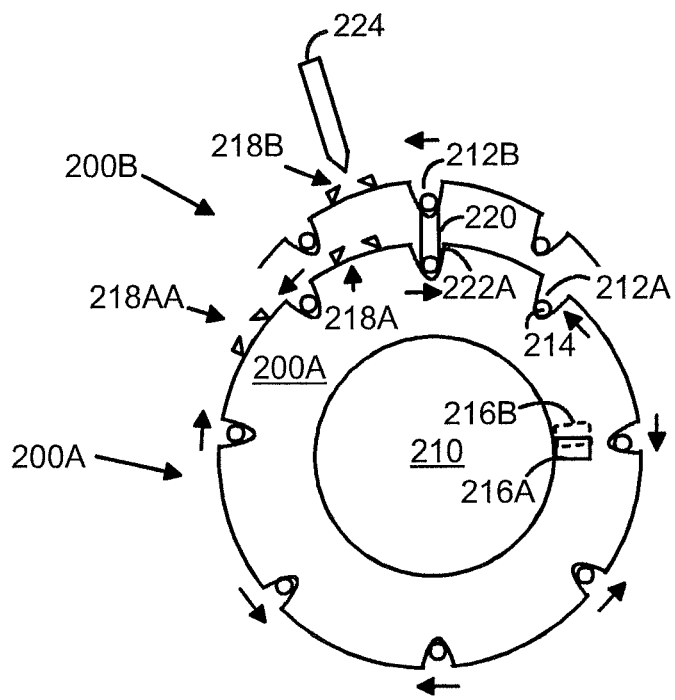
FIG. 2 shows a stator cooling arrangement in accordance with an exemplary embodiment of the present disclosure.

FIG. 2 shows a stator cooling arrangement in accordance with an exemplary embodiment of the present disclosure. FIG. 2 shows an embodiment for cooling the stator 200, which is stacked from stator segments or disks such as 200A, 200B. The stator may include tens or hundreds of stator disks, which can be similar to each other.

As shown in FIG. 2, U-shaped recesses 212 are provided on the outer edge of the stator disks 200A, 200B. To each recess, a cooling pipe 214 is placed for conveying the cooling medium, such as liquid or gas. FIG. 2 also shows positioning elements 218A, 218B of the respective disks 200A, 200B. The recesses 212A and 212B correspond to each other, that is, when those recesses are aligned with each other, the two disks 200A, 200B are fully aligned with each other. When the two disks are fully aligned with each other, also all the positioning elements of the two disks are fully aligned with each other.

In the exemplary embodiment of FIG. 2, the disk 200B is rotated counterclockwise such that the mutually corresponding recesses 212A and 212B become misaligned with each other. TAs the disk 200B continues to rotate, the recess 212B becomes aligned with the next recess of disk 200A, that is 222A. When the recesses 212B and 222A are aligned with each other, it is possible to place the cooling pipe to the straight cooling channel formed by the two recesses and corresponding recesses of other stator disks.

When all the cooling pipes have been placed to the respective cooling channels formed by the recesses of the disk, the mutual positioning of the disks starts. Before the positioning, the positioning elements 218A, 218B are misaligned with each other. Also the coil slots of the stator disks are misaligned with each other. FIG. 2 shows two corresponding slots, 216A and 216B of the respective disks 200A and 200B which have become misaligned when the pipe 220 has been placed to the cooling channel.

To perform the positioning, a positioning member, such as the positioning band 224, is protruded to the positioning elements. This has the effect that the positioning elements 218A, 218B become aligned with each other and also the coil slots 216A, 21B become aligned with each other.

However, the recesses 212B and 222A, which were aligned with each other before the rotation, become misaligned with each other. The recesses then exert a pressing force on the cooling pipe 220 placed to the cooling channel. The pressing force is indicated in FIG. 2 with arrows at the recesses showing the direction towards which the cooling pipe is pressed. For instance, the recess 222A presses the pipe to the right, whereas the recess 212B of the disk 200B presses the pipe 220 to the left. This way the neighboring disks exert opposite forces on the disks thereby keeping the pipe 220 tightly in its place.

FIG. 2 shows an exemplary embodiment for cooling the stator 100. In another exemplary embodiment, when stacking the disks together, the mutual rotation of the disks may be carried out in several ways. For example, every other disk may have the same rotation. Thus, odd numbered disks may remain unrotated, and even numbered disks may be rotated counterclockwise the angle of one recess interval as is the case with disk 200B in FIG. 2. The rotation angle can be at 180 degrees or some other suitable angle. Furthermore, the rotation does not need to be carried out one disk at a time. Alternatively, for instance, a sub-stack of disks, such as 5 neighboring disks, can have the same rotation. The next 5 disks may have the same rotation, and so on.

The recesses, such as 212A and 212B, do not need to be recesses on the outer edge of the stator disk. In another exemplary embodiment, the recesses for receiving the cooling pipes may be through holes on the disks. The positioning member in that case may be a pin that fits into the holes of the disks. In that case, as also in the embodiment of FIG. 2, the positioning member advantageously has a wedge-shaped head such that it is possible to press the positioning member to the positioning elements and cause the rotation of the disk to achieve alignment of the disks.

A stator disk includes one or more positioning elements for aligning the stator disk with another stator disk, the one or more positioning elements being positioned to the stator disk such that when the stator disk is set to a rotated position with respect to another similar stator disk to align the recesses of the disks for receiving of cooling pipes, the positioning elements of the two disks become only partly aligned with each other. The "rotated position" here refers to a situation, where the disks are not fully aligned with other. In a fully aligned situation, all the recesses and positioning elements are aligned with each other, The "rotated position", however can call for the recesses of the disks being aligned in such a way that the cooling pipes can be placed into the recesses. Furthermore, the positioning elements of the disks are not fully overlapping but are in such a way overlapping that the positioning member can be put into the positioning elements of the disks to align the positioning elements.

When the situation is examined after the positioning member has been put into the positioning elements, the positioning elements in the disk are positioned such that when the stator disk is set to a rotated position with respect to another similar stator disk, the coil slots of the disks become aligned with each other, and the cooling pipes are placed into the recesses and the recesses of mutually rotated disks hosting a cooling pipe cause substantially opposite pressing forces on the cooling pipe.

Figure 3:
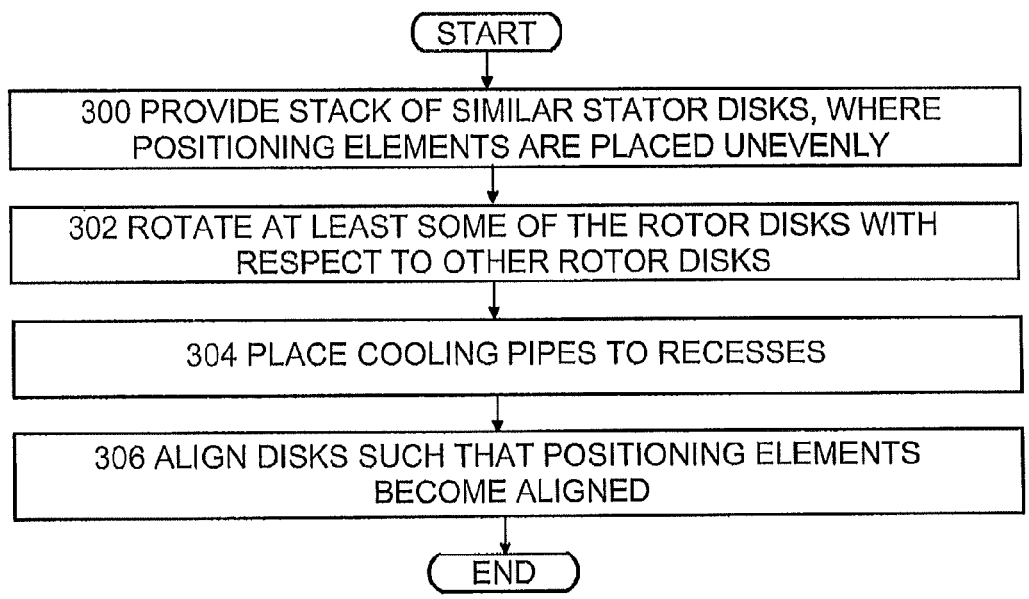
FIG. 3 shows a method of mounting a stator of an electric motor in accordance with an exemplary embodiment of the present disclosure.

FIG. 3 shows a method of mounting a stator of an electric motor in accordance with an exemplary embodiment of the present disclosure.

In step 300, a plurality of similar stator disks that are to be stacked to a stator, are provided. In the stator disks, there is at least some unevenness or non-symmetry in the distribution of the positioning elements. This results in an arrangement in which when two similar disks are taken, there is only a limited number of rotation positions in which all the positioning elements of the disks are fully aligned with each other. This limited number of positions is smaller than the number of positioning elements in the disks. In an exemplary embodiment, one rotation position is implemented.

In step 302, at least some of the disks are rotated with respect to the other disks. The rotation may be carried out in several ways. The rotation may be carried out disk by disk or sub-stacks of disks may be rotated. A sub-stack may include five disks, for instance. The first sub-stack would have one rotation position, the second sub-stack would have another rotation position, and so on.

In step 304, the cooling pipes are placed into the recesses. At this stage, the cooling channels formed by the aligned recesses are straight such that placing of the cooling pipes into the recesses is easy. When the cooling pipes have been placed into the recesses of the mutually rotated disks, the positioning elements provided in the disks become misaligned with each other. Also the coil slots of the disks are at this stage misaligned with each other.

In step 306, the positioning member is placed into the positioning elements of the disks. This causes the positioning elements of the disks to become aligned with each other and also the coil slots of the disks to become aligned with each other.

A further effect is that the mutually rotated disks cause opposite forces on the cooling pipes, thereby providing a tight fastening of the pipes to the cooling channels formed by the recesses.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A stator disk of an electric motor stator, comprising:
   a set of recesses, each recess being configured to a receive a cooling pipe; and
   one or more positioning elements for aligning the stator disk with another stator disk, the one or more positioning elements being positioned to the stator disk such that when the stator disk is set to a rotated position with respect to the other stator disk in order to align the recesses of the disks for receiving cooling pipes, the positioning elements of the two disks become only partly aligned with each other.

2. The stator disk according to claim 1, wherein when the positioning elements are aligned with other, a pair of recesses of the disks hosting a same cooling pipe cause substantially opposite pressing forces on the cooling pipe.

3. The stator disk according to claim 1, wherein the positioning element is configured to receive a positioning member for alignment of the positioning elements of the disks to each other.

4. The stator disk according to claim 1, wherein the stator disk comprises coil slots, which coil slots become misaligned with coil slots of a similar stator disk when the two disks are in a rotated position while the recesses of the disks are aligned with each other for receiving a cooling pipe therein.

5. The stator disk according to claim 1, wherein the recess for receiving the cooling pipe is a groove on the outer edge of the stator disk.

6. The stator disk according to claim 1, wherein the recess for receiving the cooling pipe is a through hole in the body of the stator disk.

7. A stator of an electric motor, comprising:
a plurality of stator disks stacked together to form the stator, wherein each stator disk comprises:
a set of recesses, each recess being configured to a receive a cooling pipe; and one or more positioning elements for aligning the stator disks together, wherein the one or more positioning elements are positioned to the stator disks such that when two stator disks are set to a rotated position with respect each other in order to align the recesses of the disks for receiving a cooling pipe, the positioning elements of the two disks become only partly aligned with each other.

8. The stator according to claim 7, wherein the positioning elements are partly overlapping to allow a positioning member to penetrate the positioning elements to align the positioning elements with each other.

9. The stator according to claim 8, wherein when the positioning member is positioned with respect to the positioning elements for alignment of the positioning elements with each other, the recesses of the mutually rotated disks are configured to exert substantially opposite pressing forces to the cooling pipes positioned therein.

10. The stator according to claim 7, wherein before positioning the positioning member with respect to the positioning elements of the disks, the coil slots of the mutually rotated disks are misaligned with each other.

11. A method of mounting a stator of an electric motor, comprising:
providing a plurality of stator disks, each disk having recesses for receiving cooling pipes, and one or more alignment elements for alignment of the disk to other stator disks;
rotating at least some of the stator disks to a rotated position with respect to other stator disks, such that the recesses of the mutually rotated disks are aligned, and the positioning elements are misaligned with each other;
placing the cooling pipes in the recesses; and
aligning the positioning elements with each other such that the recesses of the mutually rotated disks cause opposite pressing forces to the cooling pipes.

\* \* \* \* \*